(12) United States Patent
Krieger et al.

(10) Patent No.: US 7,310,369 B1
(45) Date of Patent: Dec. 18, 2007

(54) SNR-RELATED PARAMETER ESTIMATION METHOD AND SYSTEM

(75) Inventors: Abraham Krieger, San Diego, CA (US); Ramaswamy Murali, San Diego, CA (US); Donald Brian Eidson, San Diego, CA (US); Sachar Kons, Haifa (IL)

(73) Assignee: Conexant Systems, Inc., San Diego, CA (US)

( * ) Notice: Subject to any disclaimer, the term of this patent is extended or adjusted under 35 U.S.C. 154(b) by 955 days.

(21) Appl. No.: 09/870,926

(22) Filed: May 30, 2001

Related U.S. Application Data

(60) Provisional application No. 60/255,875, filed on Dec. 15, 2000.

(51) Int. Cl.
H03D 3/18 (2006.01)
H03D 3/24 (2006.01)
(52) U.S. Cl. ............ 375/227; 375/319; 375/324
(58) Field of Classification Search ......... 375/227, 375/316–352
See application file for complete search history.

(56) References Cited

U.S. PATENT DOCUMENTS

| | | | | |
|---|---|---|---|---|
| 4,627,103 A | * | 12/1986 | Fukuhara | 455/226.3 |
| 5,394,439 A | * | 2/1995 | Hemmati | 375/242 |
| 5,703,526 A | * | 12/1997 | Meyer | 329/304 |
| 6,108,373 A | * | 8/2000 | Fargues et al. | 375/227 |
| 6,201,817 B1 | * | 3/2001 | Sullivan | 370/463 |
| 6,484,284 B2 | * | 11/2002 | Smallcomb | 714/786 |
| 6,542,558 B1 | * | 4/2003 | Schulist et al. | 375/340 |
| 6,591,390 B1 | * | 7/2003 | Yagyu | 714/755 |
| 6,829,313 B1 | * | 12/2004 | Xu | 375/341 |
| 6,901,117 B1 | * | 5/2005 | Classon et al. | 375/341 |

OTHER PUBLICATIONS

Bahl, L. R., et al., *Optimal Decoding of Linear Codes for Minimizing Symbol Error Rate*; IEEE Transactions on Information Theory, Mar. 1974, pp. 284-287.
Benedetto, S., et al., *A Soft-Input Soft-Output Maximum A Posteriori (MAP) Module to Decode Parallel and Serial Concatenated Codes*; TDA Progress Report, 42-127, Nov. 1996, pp. 1-20.
Berrou, Claude, et al., *Near Shannon Limit Error—Correcting Coding and Decoding: Turbo-Codes* (1); IEEE, 1993, pp. 1064-1070.
Divsalar, D. and Pollara, F., *Turbo Trellis Coded Modulation with Iterative Decoding for Mobile Satellite Communications*; Jet Propulsion Laboratory, California Institute of Technology, pp. 1-7.

(Continued)

*Primary Examiner*—Curtis B. Odom
(74) *Attorney, Agent, or Firm*—Howrey LLP

(57) ABSTRACT

A method for estimating an SNR-related parameter, such as $E_S/N_0$, from one or more symbols. The number of symbols within a predetermined number of symbols that fall within one or more collection areas is counted. The count is then associated with a value of the SNR-related parameter. This association may be performed through one or more lookup tables. In one application, a scaling factor is derived from the count. The scaling factor may be used to scale symbols before they are quantized and inputted into a trellis decoder such as a log-MAP decoder.

51 Claims, 13 Drawing Sheets

OTHER PUBLICATIONS

Robertson, P., et al., *A Comparison of Optimal and Sub-Optimal MAP Decoding Algorithms Operating in the Log Domain*; IEEE, 1995, pp. 1009-1013.

Viterbi, Andre J., *An Intutive Justification and a Simplified Implementation of the MAP Decoder for Convolutional Codes*; IEEE Journal on Selected Areas in Communications, vol. 16, No. 2, Feb. 1998, pp. 260-264.

* cited by examiner

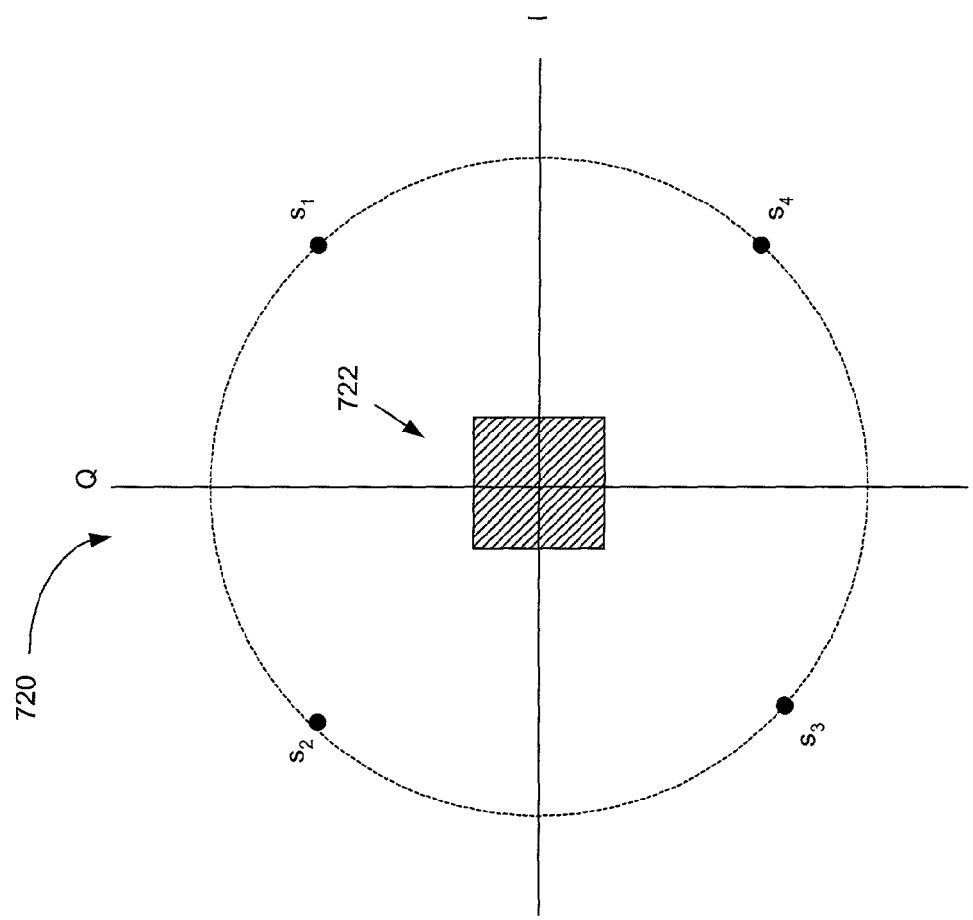

SNR-RELATED PARAMETER ESTIMATION METHOD AND SYSTEM

This application claims the benefit of U.S. Provisional Application No. 60/255,875, filed Dec. 15, 2000, which is hereby fully incorporated by reference herein as though set forth in full.

BACKGROUND OF THE INVENTION

1. Field of the Invention

This invention relates to the estimation, derivation and use of a signal-to noise-ratio (SNR)-related parameter, such as $E_S/N_0$, for symbols received over a communication channel.

2. Related Art

In wireless or wireline communications systems, it is often necessary or desirable to estimate a signal-to-noise ratio-related parameter for symbols received over a communications channel. One such parameter is $E_S/N_0$, where $E_S$ is the received energy/symbol, and $N_0$ is the noise power spectral density. Another is $E_B/N_0$, where $E_B$ is the energy/bit, and $N_0$ is again the noise power spectral density. The parameter $E_B/N_0$ is related to $E_S/N_0$ as follows:

$$\frac{E_B}{N_0} = \frac{E_S}{N_0} R_{bitspersymb}$$

where $E_B$ and $N_0$ are as defined previously, and $R_{bitspersymb}$ is the number of source bits (pre-error correction coding) delivered by each channel symbol.

Both $E_B/N_0$ and $E_S/N_0$ bear a relationship with SNR and thus are properly characterized as SNR related parameters. For example, the parameter $E_B/N_0$ bears the following relationship to SNR:

$$\frac{E_B}{N_0} = \frac{S}{N}\left(\frac{W}{R_B}\right)$$

where $E_B$ and $N_0$ are as defined previously, S is the average signal power, N ($=N_0 W$) is the average noise power, S/N is the signal to noise ratio (SNR), W is the system bandwidth, and $R_B$ is the bit transmission rate.

Moreover, the variance, $\sigma^2$, of the additive noise borne by the received symbols is related to the noise spectral density by the relationship $$\sigma^2 = \frac{N_0}{2}.$$

Before the symbols are input to a trellis decoder, for example, it may be necessary to estimate an SNR-related parameter such as $E_S/N_0$. The reason is that the computation of branch and state metrics performed during the decoding process may may be weighted and/or quantized differently depending on the relative value of the noise energy associated with the symbols being decoded. What's more, these signal-to-noise ratio estimates may be used to assist a user in pointing an antenna to ascertain which pointing direction leads to most effective reception.

For additional information on trellis decoders, including maximum a posteriori (MAP) decoders, log-MAP decoders, Max-Log-Map decoders, Viterbi decoders, and Soft Output Viterbi (SOVA) decoders, please see A. Viterbi, "An Intuitive Justification and a Simplified Implementation of the MAP Decoder for Convolutional Codes," IEEE Journal On Selected Areas In Communications, Vol. 16, No. 2, February 1998, pp. 260-264; S. Benedetto et al., "A Soft-Input Soft-Output Maximum A Posteriori (MAP) Module to Decode Parallel and Serial Concatenated Codes," TDA Progress Report 42-127, Nov. 15, 1996, pp. 1-20; D. Divsalar et al., "Turbo Trellis Coded Modulation with Iterative Decoding for Mobile Satellite Communications," Proc. Int. Mobile Satellite Conf., June 1997; "A Comparison of Optimal and Sub-Optimal MAP Decoding Algorithms Operating in the Log Domain," Proc. IC '95, Seattle, Wash. 1995, pp. 1009-1013; C. Berrou et al., "Near Shannon Limit Error-Correcting Coding And Decoding: Turbo-Codes," Proc. IEEE Int. Conf. Commun., Geneva, Switzerland, 1993, pp. 1064-1070; L. R. Bahl et al., "Optimal Decoding of Linear Codes For Minimizing Symbol Error Rate," IEEE Trans. Inform. Theory, Vol. IT-20, pp. 284-287, 1974, each of which is incorporated by reference herein as through set forth in full.

One approach for estimating total power involves analyzing Automatic Gain Control (AGC) settings at the receiver. However, this approach is cumbersome because an estimate of total received power does not easily translate into an estimate of an signal-to-noise ratio related parameter such as $E_S/N_0$. For one, it may also be impractical since extremely precise calibration of the AGC and other receive chain gain elements over voltage and temperature variations may not be easy. Moreover, knowledge of the noise figure of these same elements may not be characterized, especially over temperature variations. Another approach for estimating total power is to estimate the noise power, $N_p$, by (1) computing the sample variance of $\sqrt{I^2+Q^2}$, (2) estimating the 'signal power+noise power', $S_p + N_p$, by computing the mean of $I^2+Q^2$, and forming the appropriate ratios and subtractions to derive the signal to noise ratio $S_p/N_p$, and then (3) converting $S_p/N_p$ to the $E_S/N_0$ using the relations $S_p=E_S$ and $N_0/2=N_p$. Here I and Q are the in-phase (I) and quadrature phase (Q) components of quadrature symbols received at the receiver. However, this computational process is involved.

SUMMARY

A system of and method for estimating an signal-to-noise-ratio (SNR)-related parameter, including but not limited to $E_S/N_0$, for symbols received over a communications channel is provided by the invention. The symbols are analyzed to determine if they fall within one or more predetermined collection areas defined in relation to a constellation of possible transmitted symbols. In one implementation, AGC has been performed on the symbols, so that the average signal power is known. The number of received symbols within a group which fall within the one or more collection areas is counted. The resulting count may be filtered and/or averaged over multiple symbol groups. A predetermined lookup table may be provided to correlate values of the count with values of the SNR-related parameter. The SNR-related parameter in the table may be expressed in dB in order to increase the dynamic range of the table.

In one application, a count is empirically determined, and correlated with a value of the corresponding SNR-related parameter. This value, if expressed in dB, is converted into linear form to form a scale factor which may be used to scale the received symbols before they are input to a trellis decoder. The scaled symbols may then be quantized. A uniform quantization procedure may be performed. The quantization procedure may be characterized by a quantization delta which has been optimized around a nominal value of the SNR-related parameter.

The count may be updated or refreshed over time. Consequently, the scaling factor may change over time as the count changes.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 7E illustrates an example of a collection area centered within a QPSK symbol constellation.

DETAILED DESCRIPTION

I. Example Application

In this section, for illustrative purposes only and without limiting effect, an example application of the invention will be described. However, it should be appreciated that many other applications of the invention are possible. In particular, although the application described here relates to the use of the invention in the context of a log-MAP decoder, it should be appreciated that the invention may be used in other contexts, and with other trellis decoders besides log-MAP including, without limitation, soft output decoders, MAP decoders, Viterbi decoders, SOVA decoders, and MAX-log-MAP decoders.

Figure 1:
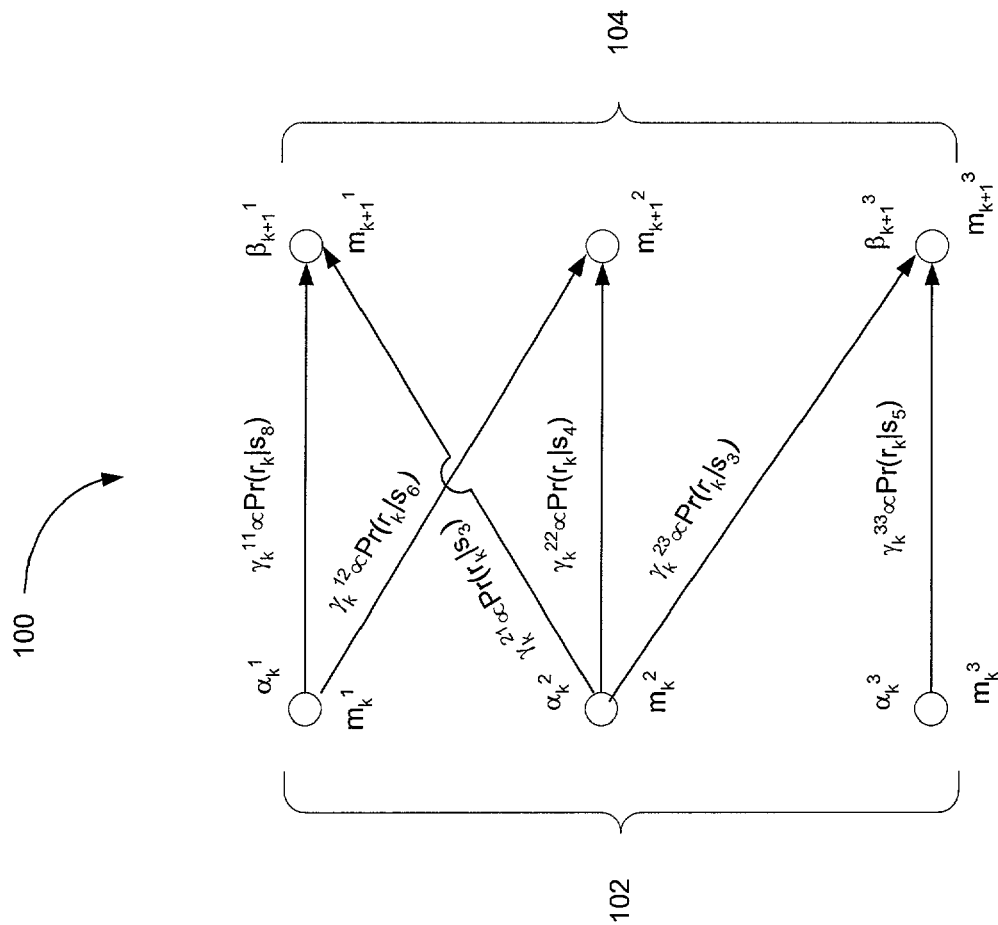
FIG. 1 illustrates an example of a trellis representation for a log-MAP decoder.

A portion 100 of a trellis representation for a log-MAP decoder is illustrated in FIG. 1. The log-MAP decoder may be the inner decoder in a serial concatenated convolutional code decoder. The trellis representation illustrates the states of a corresponding log-MAP encoder and transitions between the states over discrete points in time. In FIG. 1, numeral 102 identifies the possible states of the encoder at time k, and numeral 104 identifies the possible states of the encoder at time k+1.

In the particular example illustrated in FIG. 1, for illustrative purposes only and without any limiting effect, there are three possible states of the encoder illustrated at time k, $m_k^1$, $m_k^2$, and $m_k^3$, and three possible states of the encoder illustrated at time k+1, $m_{k+1}^1$, $m_{k+1}^2$, and $m_{k+1}^3$. The branches between the states represent possible hypotheses about the symbol that was transmitted at time k.

During the decoding process, state metrics are computed for each of the states in the trellis representation, and branch metrics are computed for each of the transitions between the states in the trellis representation.

State metrics are computed recursively. Both forward state metrics and reverse state metrics are computed. The forward state metrics are metrics which, for states at time k, are computed recursively based on the state metrics for time k−1. The reverse state metrics are metrics which, for states at time k, are computed recursively based on the state metrics for time k+1. In FIG. 1, the forward state metrics for states $m_k^1$, $m_k^2$, and $m_k^3$ are respectively identified as $\alpha_k^1$, $\alpha_k^2$, and $\alpha_k^3$, and the reverse state metrics for $m_{k+1}^1$, $m_{k+1}^2$, and $m_{k+1}^3$ are respectively identified as $\beta_{k+1}^1$, $\beta_{k+1}^2$, and $\beta_{k+1}^3$.

A branch metric for a transition between states m and m' at time k is referred to in FIG. 1 as $\gamma_k^{mm'}$. A branch metric at time k represents the conditional probability of the received symbol at time k, $r_k$, given the transmission of a hypothesized symbol $s_k$, at time k. The transitions illustrated in FIG. 1 comprise the following: 1.) a transition between state 1 at time k and state 1 at time k+1, having a branch metric $\gamma_k^{11}$ representative of the conditional probability $Pr(r_k|s_8)$; 2.) a transition between state 1 at time k and state 2 at time k+1, having a branch metric $\gamma_k^{12}$ representative of the conditional probability $Pr(r_k|s_6)$; 3.) a transition between state 2 at time k and state 1 at time k+1, having a branch metric $\gamma_k^{21}$ representative of the conditional probability $Pr(r_k|s_3)$; 4.) a transition between state 2 at time k and state 2 at time k+1, having a branch metric $\gamma_k^{22}$ representative of the conditional probability $Pr(r_k|s_4)$; 5.) a transition between state 2 at time k and state 3 at time k+1, having a branch metric $\gamma_k^{23}$ representative of the conditional probability $Pr(r_k|s_3)$; and 6.) a transition between state 3 at time k and state 3 at time k+1, having a branch metric $\gamma_k^{33}$ representative of the conditional probability $Pr(r_k|s_5)$. For illustrative purposes only, these transitions are assumed to correspond respectively with the following hypothesized symbols: $s_8$, $s_6$, $s_3$, $s_4$, $s_3$, and $s_5$.

Several examples of the recursive calculation of the forward state metrics can be described in relation to FIG. 1. One example is the calculation of the state metric $\alpha_{k+1}^1$. This calculation can be expressed using the following equation:

$$\alpha_{k+1}^1 = MAX^*(\alpha_k^1 + \gamma_k^{11}, \alpha_k^2 + \gamma_k^{21}) \tag{1}$$

where the function $MAX^*(A,B)$ is defined to be:

$$MAX^*(A,B) = MAX(A,B) + \ln(1+\exp(-|A-B|)) \tag{2}$$

Another example is the calculation of the state metric $\alpha_{k+1}^2$. This calculation can be expressed using the following equation:

$$\alpha_{k+1}^2 = MAX^*(\alpha_k^1 + \gamma_k^{12}, \alpha_k^2 + \gamma_k^{22}) \tag{3}$$

A third example is the calculation of the state metric $\alpha_{k+1}^3$. This calculation can be expressed using the following equation:

$$\alpha_{k+1}^3 = \text{MAX}^*(\alpha_k^2 + \gamma_k^{21}, \alpha_k^3 + \gamma_k^{33}) \quad (4)$$

Several examples of the recursive calculation of the reverse state metrics can also be described in relation to FIG. 1. One example is the calculation of the state metric $\beta_k^1$. This calculation can be expressed using the following equation:

$$\beta_k^1 = \text{MAX}^*(\beta_{k+1}^1 + \gamma_k^{11}, \beta_{k+1}^2 + \gamma_k^{21}) \quad (5)$$

Another example is the calculation of the state metric $\beta_k^2$. This calculation can be expressed using the following equation:

$$\beta_k^2 = \text{MAX}^*(\beta_{k+1}^1 + \gamma_k^{21}, \beta_{k+1}^2 + \gamma_k^{22}, \beta_{k+1}^3 + \gamma_{k+1}^{23}) \quad (6)$$

A joint probability is the probability of transitioning from a particular state m to a state m' at time k over a particular branch. In a log-MAP decoder, due to the expression of the state and branch metrics in the natural log domain, which allows linear domain multiplication to be performed through addition in the natural log domain, the joint probability of transitioning from a state m to a state m' at time k, $\lambda_k^{mm'}$, may be expressed $\alpha_k^m + \gamma_k^{mm'} + \beta_{k+1}^{m'}$.

In a log-MAP decoder, these joint probabilities are determined once the state and branch metrics have been. Once these joint probabilities have been determined, for each possible hypothesized symbol at time k, $s_i$, a log-likelihood function, $LL_k(s_i)$, may be determined in accordance with the following equation:

$$LL_k(s_i) = \text{MAX}^*_{\forall edges \ that \ imply \ release \ of \ symbol \ s_i}(\lambda_k^{mm'}) - \text{MAX}^*_{550 \ edges}(\lambda_k^{mm'}) \quad (7)$$

where the function MAX*(A,B) is as set forth above in expression (2). Note that this expression takes account of the possibility that more than one transition at time k may imply release of the same symbol. This occurrence is illustrated in FIG. 1, where the branch from state 2 to state 1, and that from state 2 to state 3, both imply the release of $s_3$.

Once the log-likelihood functions have been determined, the decoder then selects the hypothesis $s_i'$ at time k which has the largest LL value. This condition may be expressed as follows:

$$LL_k(s_i') = \text{MAX}_{\forall i}(LL_k(s_i)) \quad (8)$$

In the case in which the possible symbols s conform to an 8-PSK symbol constellation, as explained in co-pending U.S. patent application Ser. No. 09/815,149, which is hereby fully incorporated by reference herein as though set forth in full, a branch metric for a branch in the trellis corresponding to a received symbol r and a hypothesized symbol s may be expressed as follows:

$$\frac{rs^* + r^*s}{2\sigma^2} \quad (9)$$

where * indicates the complex conjugate operation, r and s are both complex symbols, and $\sigma^2$ is the variance of noise introduced due to transmission through a communications channel.

If r and s are quadrature symbols, r can be expressed as $r_I + jr_Q$, where $r_I$ is the in-phase component of r, and $r_Q$ is the quadrature component of r, and s can be expressed as $s_I + js_Q$, where $s_I$ is the in-phase component of s, and $s_Q$ is the quadrature component of s. Expressing r and s in these terms, the expression $rs^* + r^*s$ can be expanded to $r_I s_I - jr_I s_Q + jr_Q s_I + r_Q s_Q + r_I s_I + jr_I s_Q - jr_Q s_I + r_Q s_Q$, which simplifies to $2r_I s_I + 2r_Q s_Q$. Substituting this expression for the numerator of expression (9) yields the following for the branch metric:

$$\frac{r_I s_Q + r_Q s_I}{\sigma^2} \quad (10)$$

In order to ensure proper calculation of the state metrics reflected in expressions (1), (3)-(6) above, the denominator $\sigma^2$ must be included in the branch metrics utilized in these calculations. That is because these calculations involve use of the MAX* operation, shown above in expression (3), and the MAX* operation, being non-linear, requires that the denominator $\sigma^2$ be included so that a relative comparison of alternate branches can properly be performed.

To take account of the denominator $\sigma^2$, a preferred approach is to scale each of the received symbols r, or the components thereof, by a suitable scaling factor, prior to using these symbols in the computation of the branch metrics. The scaled symbols, or the components thereof, would then be combined with the hypothesized symbols s in the manner prescribed by expressions (9) or (10) above to compute the branch metrics. An estimate of the SNR-related parameter such as $E_S/N_0$ would be a suitable scaling factor since it acts as a proxy for the parameter $1/\sigma^2$, assuming that the AGC has scaled the signal such that the average signal power $E_S = 1$. The following expression defines the relationship between $1/\sigma^2$ and $E_S/N_0$ (expressed in dB):

$$\frac{1}{\sigma^2} = 2 \cdot 10^{\frac{(E_S)}{N_0}} \quad (11)$$

An alternate approach for taking account of the parameter $\sigma^2$ is to avoid scaling the received symbols, but to swap amongst alternate lookup tables for performing the MAX* operation, where each lookup table reflects a different value of $\sigma^2$. However, this approach is not preferred, since most log-MAP decoders require performing a large number of MAX* operations in parallel, and to avoid contention, most if not all of the MAX* operations will require their own lookup tables. Consequently, the amount of swapping that would have to be performed as $\sigma^2$ changes might be prohibitive.

Figure 2:
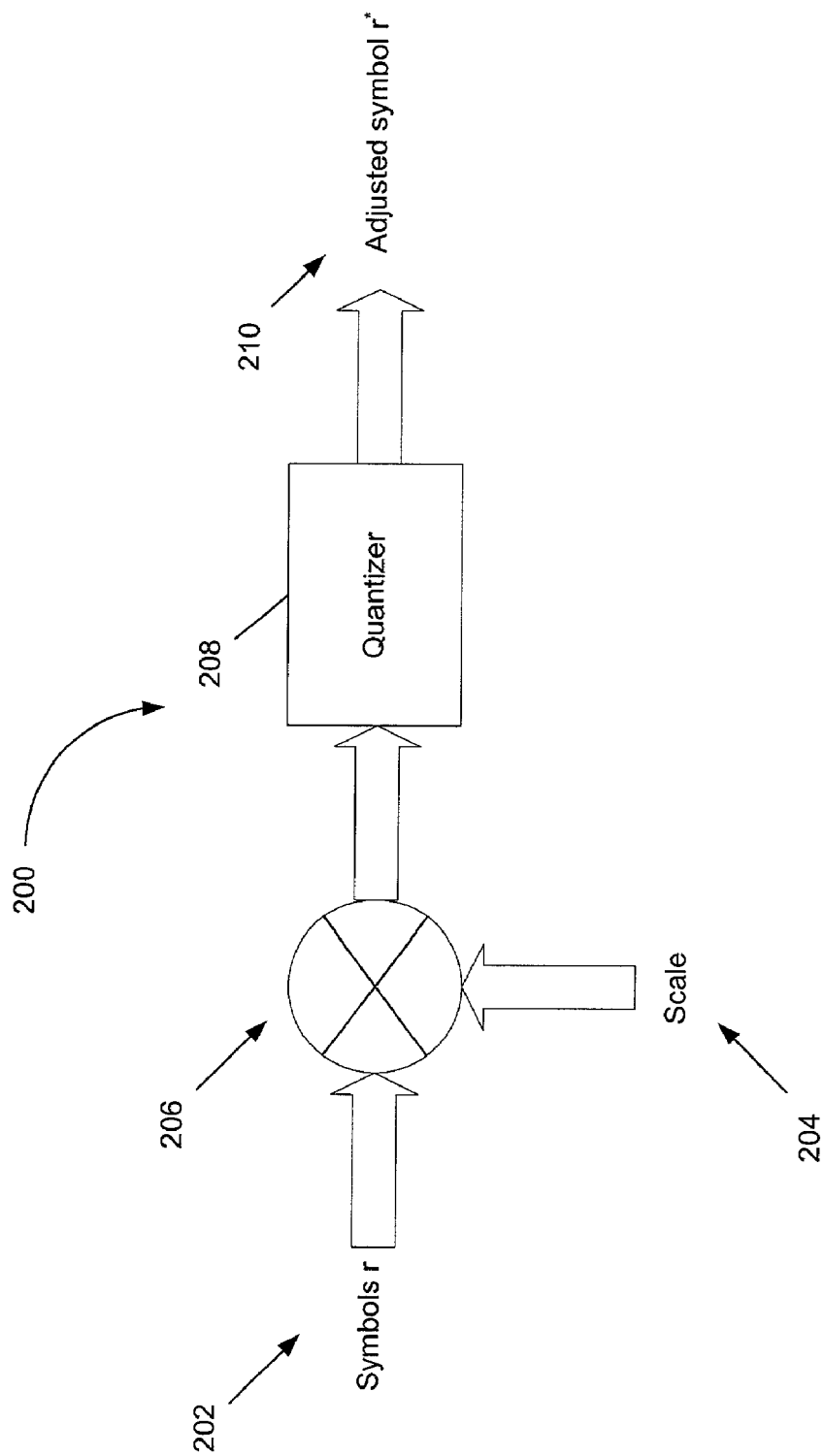
FIG. 2 is a block diagram of a system for scaling received symbols according to the invention.

FIG. 2 illustrates a system 200 for scaling received symbols before inputting the scaled symbols to a log-MAP decoder. As illustrated, symbols 202 are received over a communications channel and input to the system. The symbols are input to multiplier 206 which multiplies the symbols by scaling factor 204. The scaling factor is derived from an estimate of an SNR-related parameter such as $E_S/N_0$. The scaled symbols are then input to quantizer 208, which quantizes the scaled symbols. The quantized, scaled symbols 210 are output by the system. They may then be input to a log-MAP decoder where they are used in the computation of branch metrics.

Figure 3:
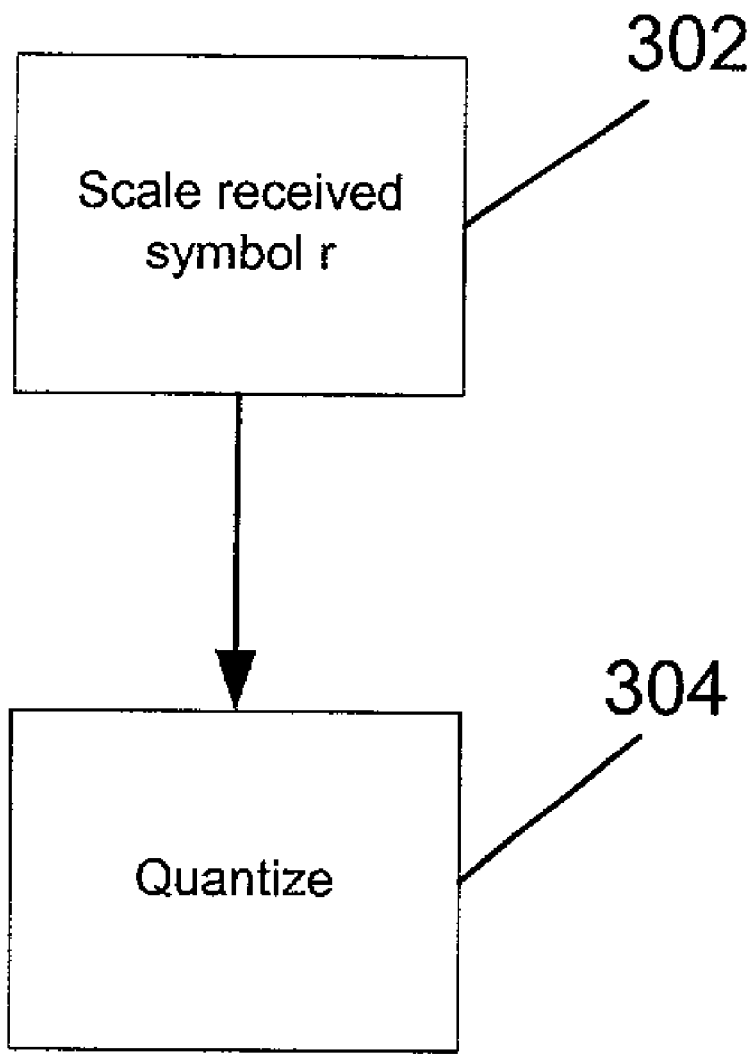
FIG. 3 is a flowchart of a method of scaling received symbols according to one application of the invention.

A method of operation of the system of FIG. 2 is illustrated in FIG. 3. As illustrated, the method begins with step 302, where symbols received over a communications channel are scaled using a scaling factor derived from an estimate of an SNR-related parameter such as $E_S/N_0$. Step 302 is followed by step 304, where the scaled symbols are quantized.

Figure 4:
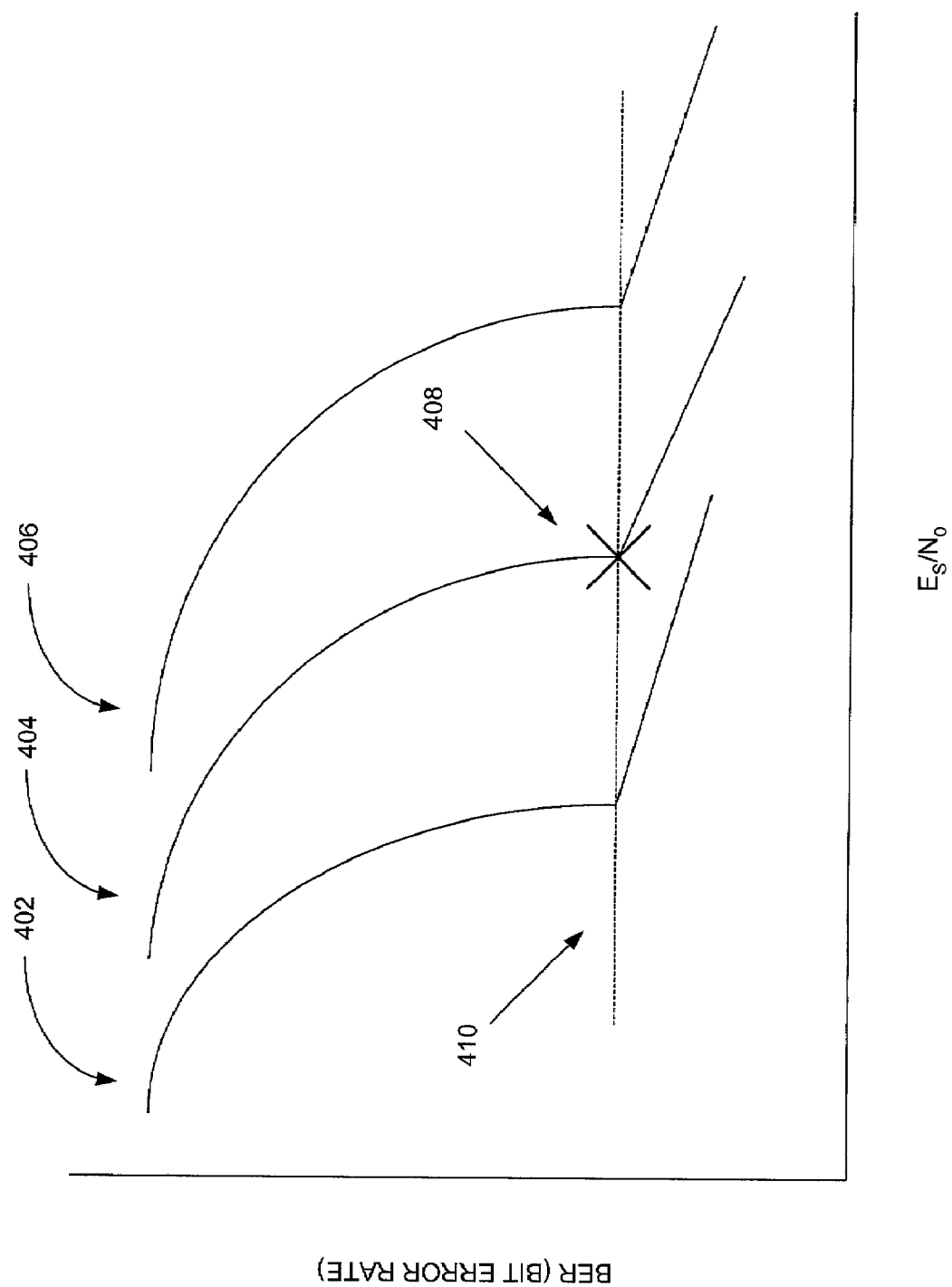
FIG. 4 illustrates an example point on a BER vs. $E_S/N_0$ curve for optimizing the quantization delta in the system of FIG. 2.

The scaled symbols may be quantized using a uniform quantizer in which the delta $\Delta$ between successive levels in the quantization scale is fixed, but is optimized around a certain point on a Bit Error Rate (BER) v. $E_S/N_0$ curve. FIG. 4 illustrates a family of BER vs. $E_S/N_0$ curves 402, 404, and 406, each corresponding to a certain Forward Error Correction (FEC) code encoding rate. Numeral 410 identifies a maximum BER level which must be maintained in operation. Numeral 408 identifies an example BER vs. $E_S/N_0$ point around which the quantization delta A may be optimized. Typically, this point will be at about an intersection with the maximum BER curve 410. An operating point with an $E_S/N_0$ much beyond then is unnecessary since the maximum BER is all that is required to be achieved for reliable communication. An operating point with an $E_S/N_0$ less than this is not acceptable because it implies a BER greater than the maximum BER which is allowed.

Once determined, the quantization delta may be fixed regardless of the encoder rate. Therefore, the quantization delta, optimized around the point 408 on curve 404 in FIG. 4, may be used even if a different encoder rate than that corresponding to curve 404 is used.

Figure 5:
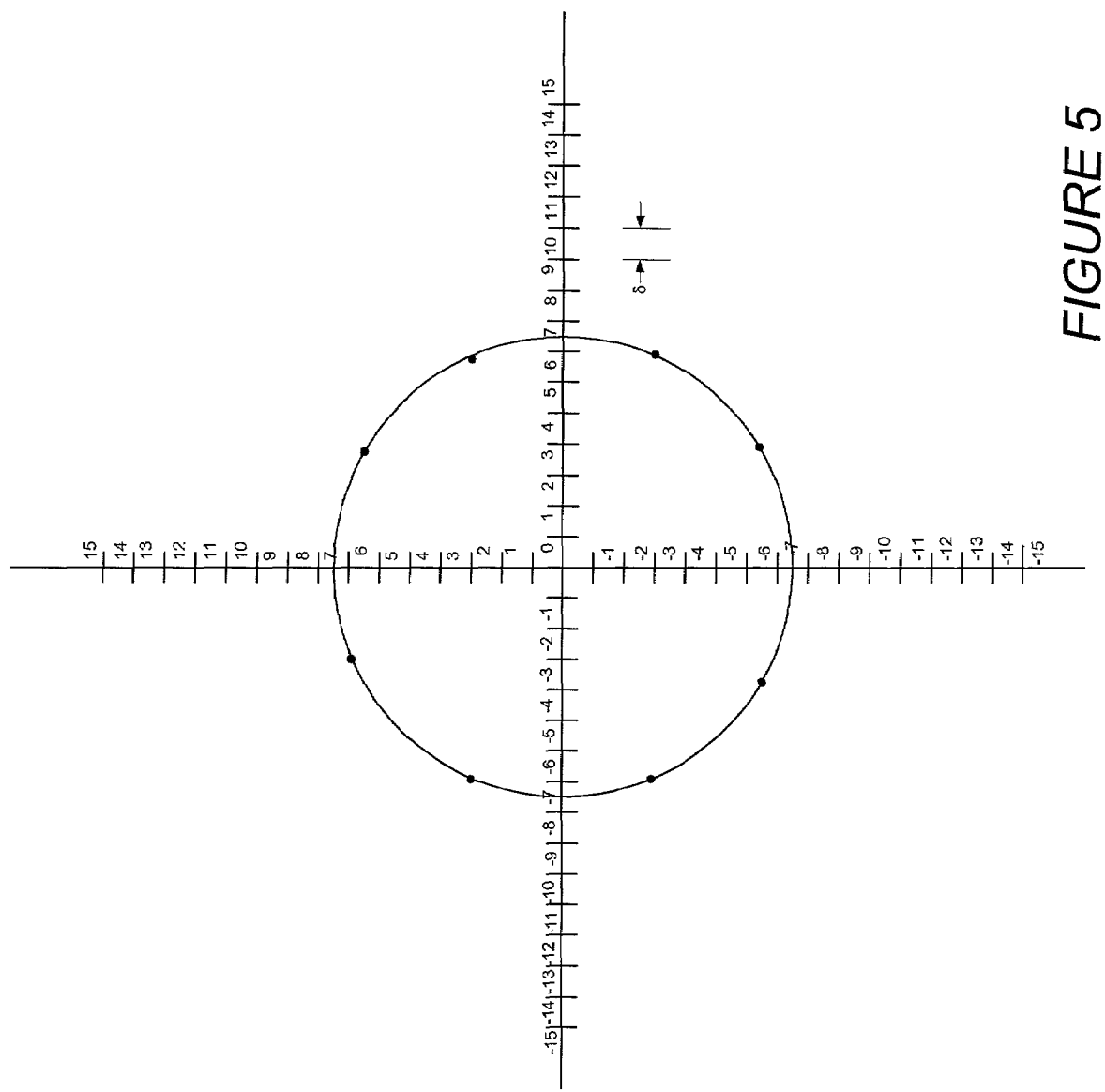
FIG. 5 illustrates one example of quantization levels in the system of FIG. 2.

In one example, a total of 4 bits is allocated to representing I and Q values of received symbols. The result is that each of the I and Q values can take on one of 16 values. The situation is depicted in FIG. 5.

The encoder rate in this example is 2/3, the modulation type 8-PSK, and the maximum allowed BER correlates with a value of $E_S/N_0$ equal to 8 dB. Optimization was performed at a value of $E_S/N_0$ equal to 8 dB. The optimal step size delta, δ, was determined using a search algorithm which sought to determine the value of delta that maximized channel capacity at a value of $E_S/N_0$ equal to 8 dB. The resulting step size delta was determined to be 0.158.

To account for scaling, an extra bit (5 bits total) was allocated to the representation of the scaled I and Q values. The scale factor, $1/\sigma^2$, for a value of $E_S/N_0$ equal to 8 dB, was determined using expression (11) to be 12.6191. The resulting quantization delta, $\Delta$, was thus determined to be 0.158·12.6191=1.9938.

II. Preferred Embodiments

Figure 6A:
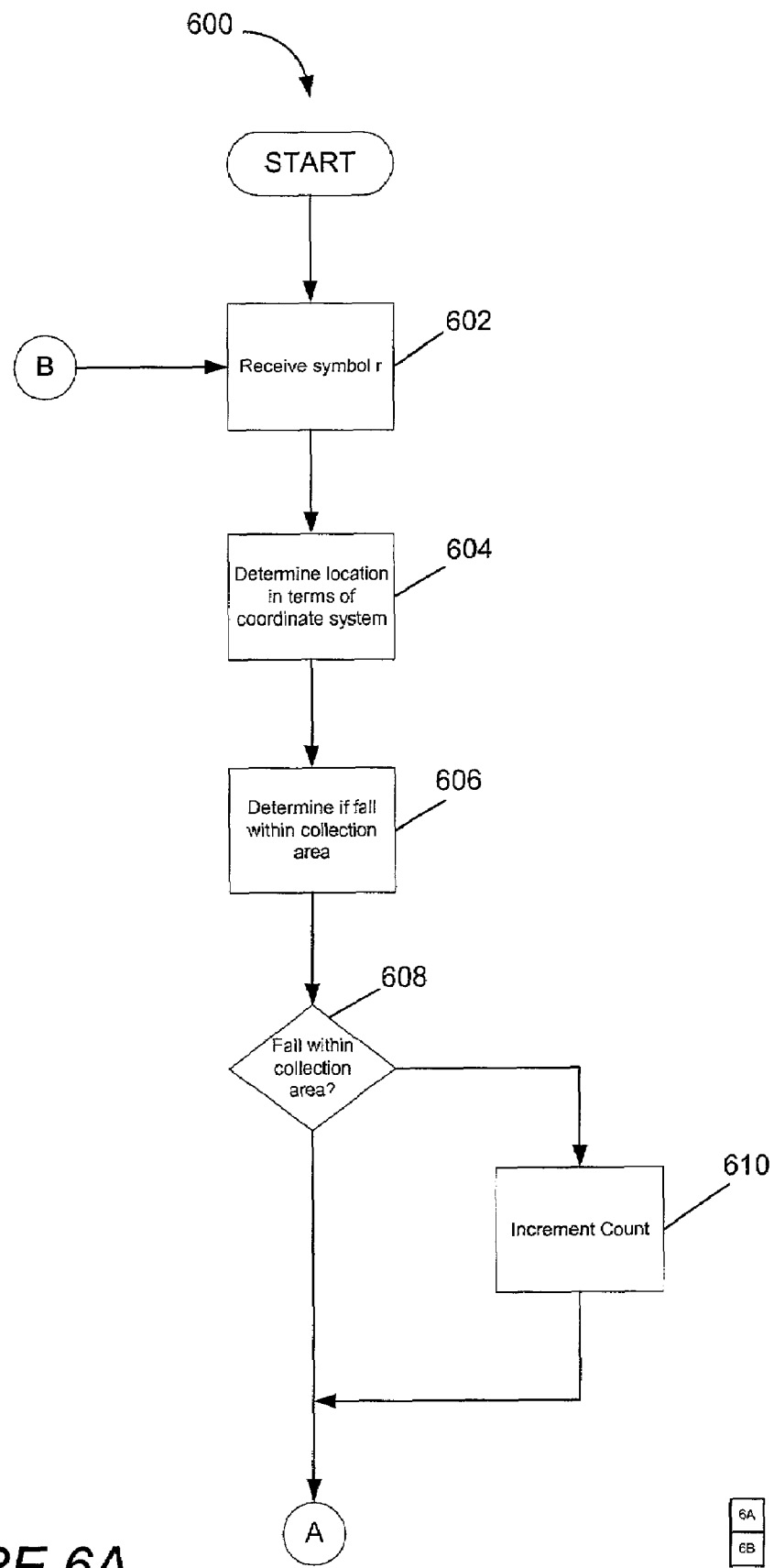
FIGS. 6A-6B are flowcharts of a method of estimating an SNR-related parameter according to the invention.
Figure 6B:
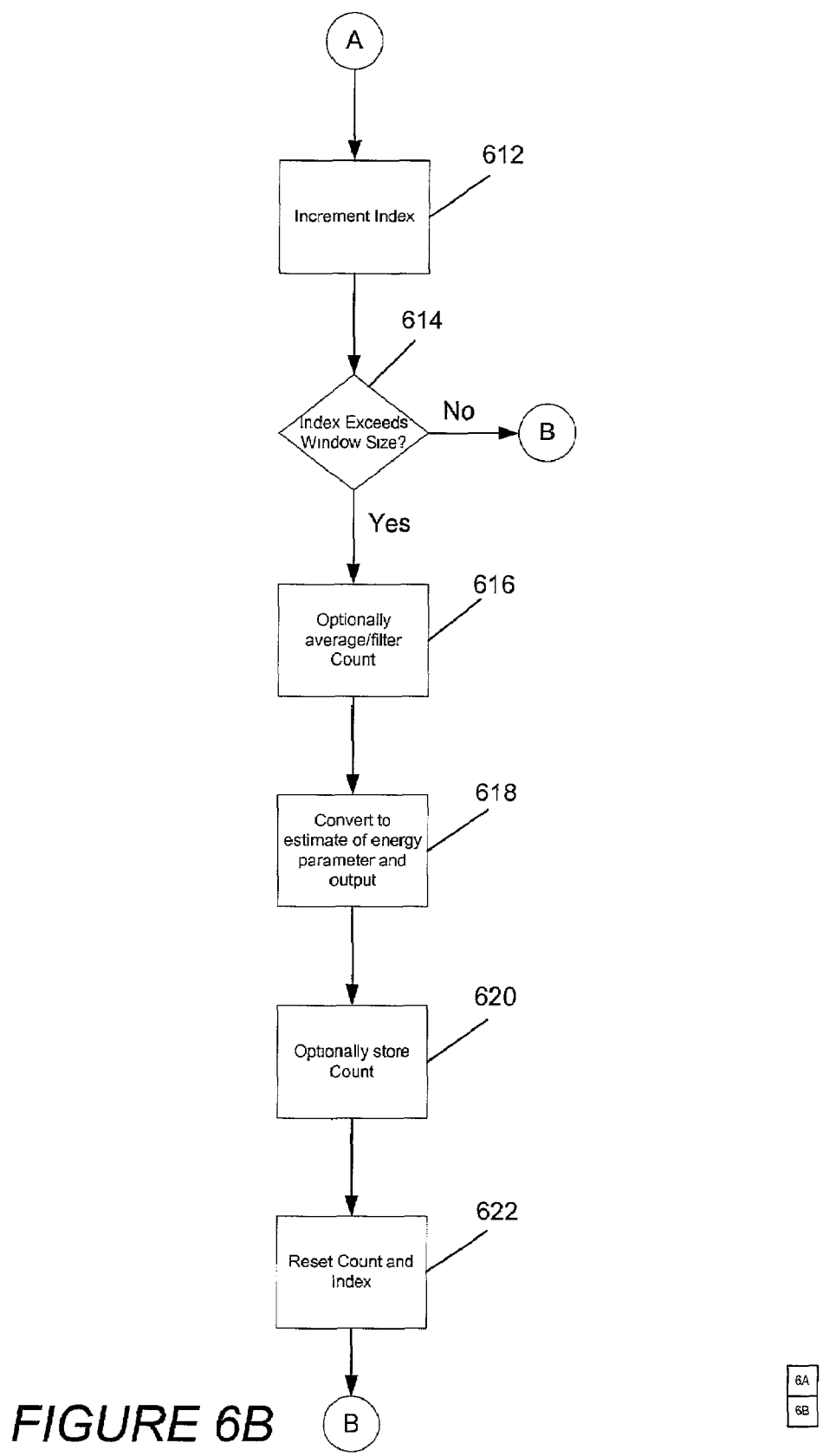

An embodiment of a method 600 for estimating an SNR-related parameter, including but not limited to $E_S/N_0$, for symbols received over a communications channel is illustrated in FIGS. 6A-6B. The method begins in step 602, where a symbol r is received after transmission over a communications channel. It is assumed that the signaling constellation has been 'centered' by AGC, so that the average power of the signal is known, and set to a fixed value, regardless of signal power transmitted or received (pre-AGC). This allows the measurement of what amounts to a 'noise spread' to be invariant of the received power. In addition, it is assumed that the symbol constellation is stationary (i.e., not rotating or jittering), which implies that the demodulator's symbol-time, phase and frequency tracking loops are locked, and are successfully tracking the signal as it continuously varies due to channel variations, etc.

Step 604 follows step 602. In step 604, the location of the symbol in terms of a predetermined coordinate system is determined. Step 606 follows step 604. In step 606, the location of the symbol is analyzed to determine if it falls within one or more predetermined collection areas.

Figure 7A:
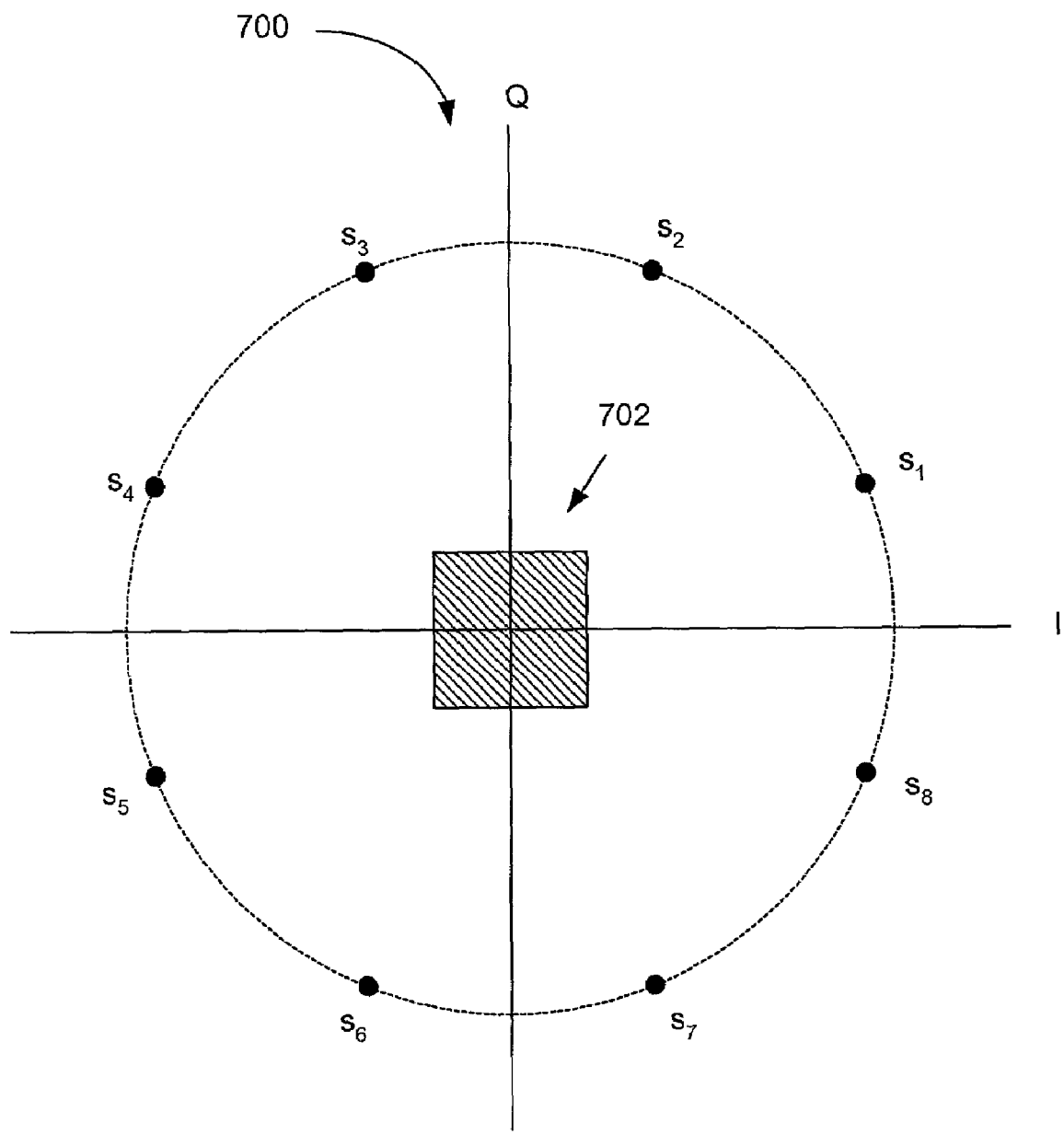
FIG. 7A illustrates an example of a collection area centered within an 8-PSK symbol constellation.

The one or more predetermined collection areas of step 606 should be defined based on the symbol constellation being used. FIG. 7A illustrates an example collection area 702 for an 8-PSK symbol constellation 700. In this particular example, the collection area is centered on the I-Q plane. It is also two-dimensional, i.e., defined in terms of both I and Q, e.g., |I|<2 and |Q|<2.

A received symbol r in this example is assumed to be a quadrature symbol having in-phase (I) and quadrature phase (Q) components. Step 604 is performed by first locating the symbol on the I-Q plane, and determining if the location of the symbol falls within the collection area 702.

Figure 7B:
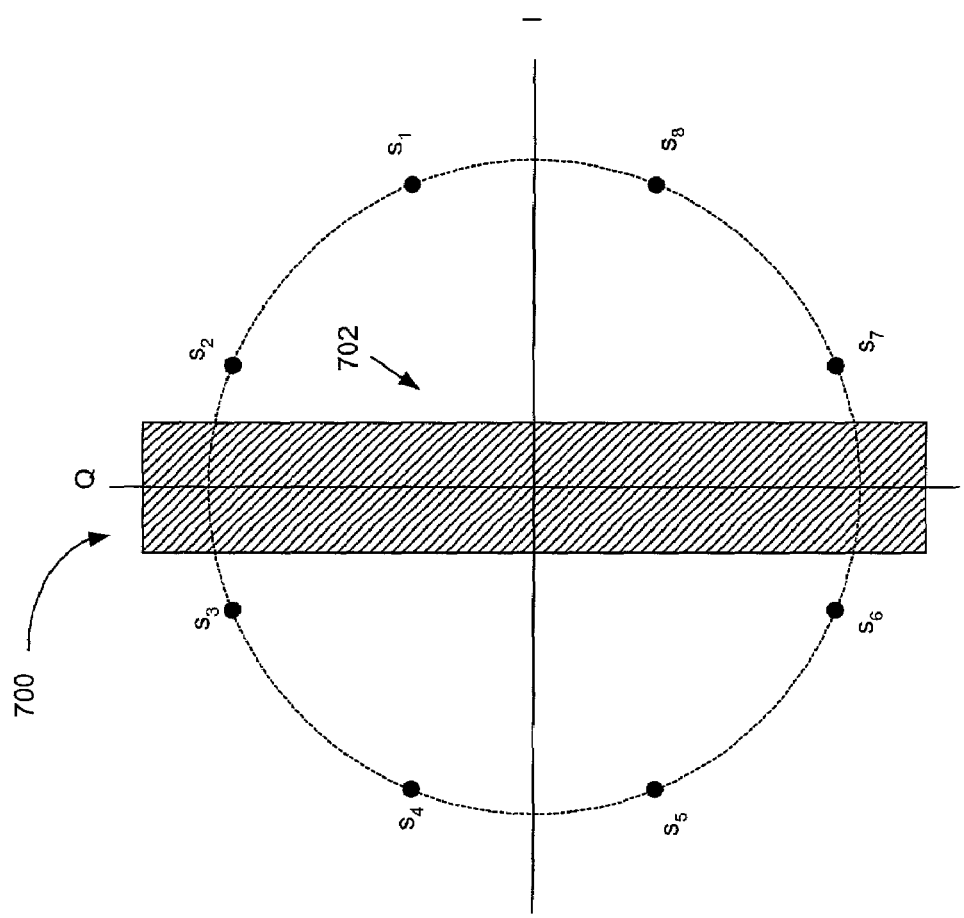
FIGS. 7B-7C illustrate examples of uni-dimensional collection areas within an 8-PSK symbol constellation.
Figure 7C:
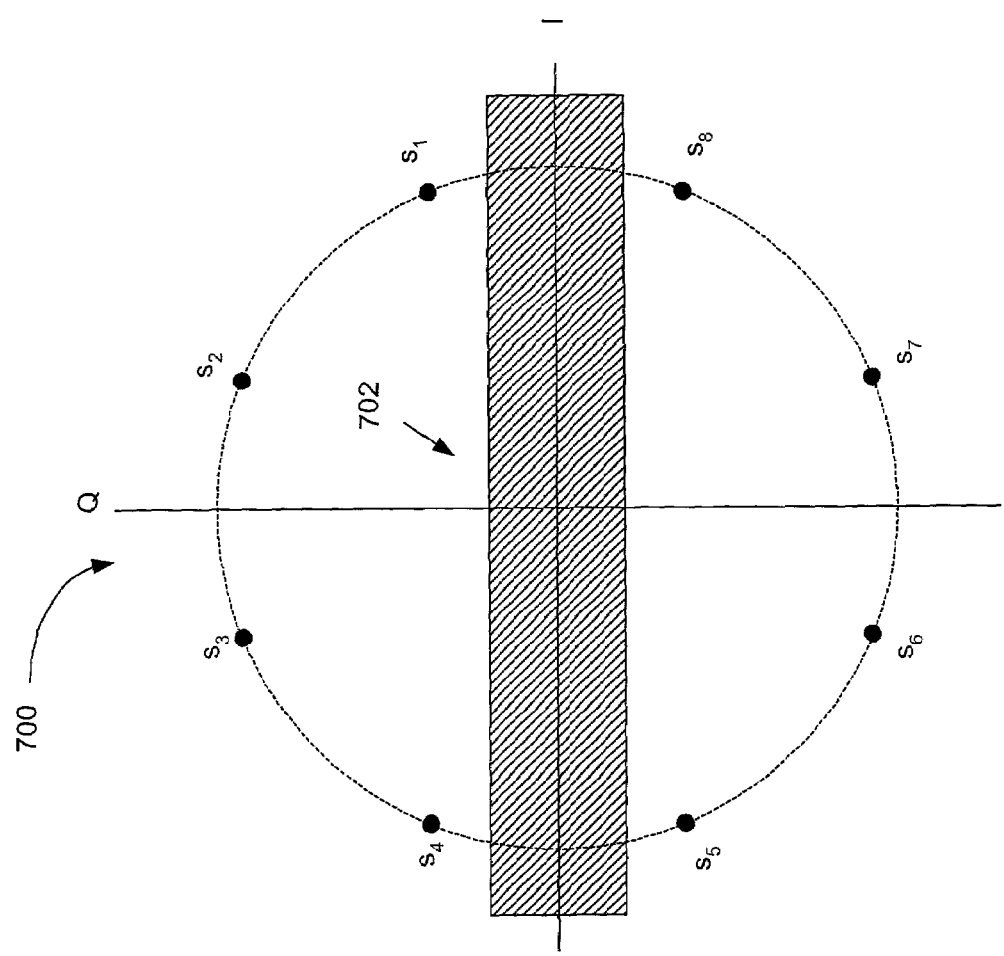
Figure 7D:
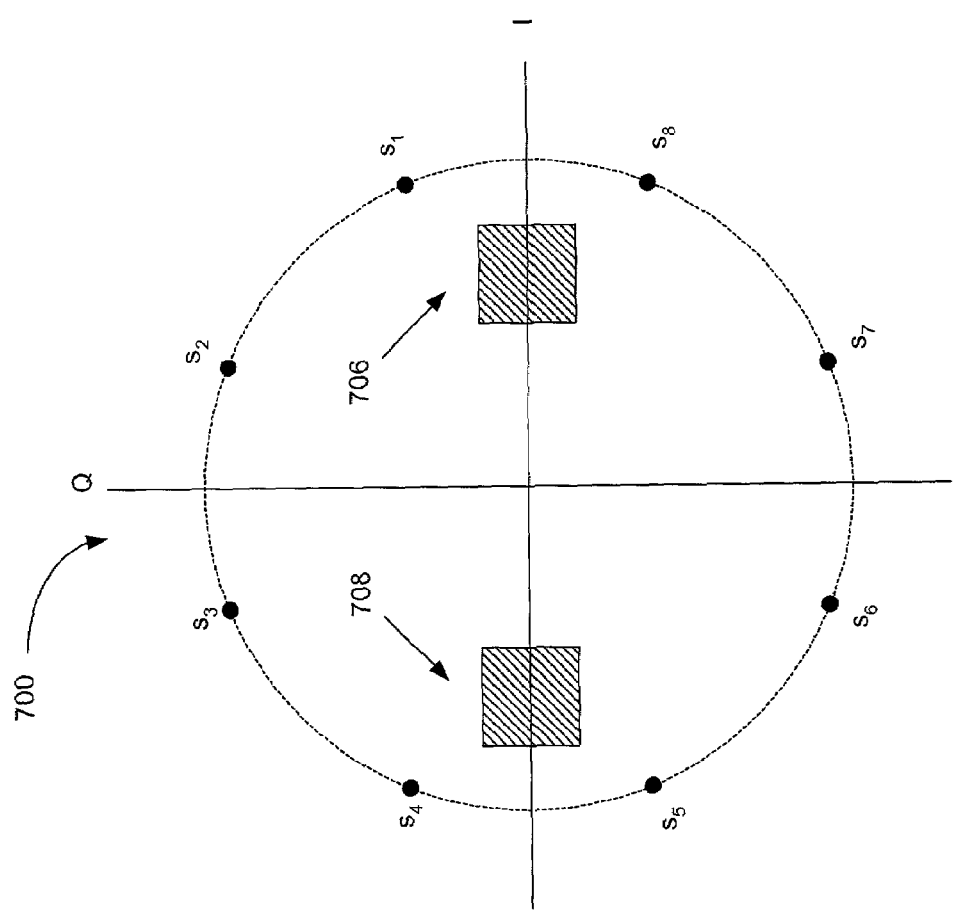
FIG. 7D illustrates an example of off-center collection areas within an 8-PSK symbol constellation.

Note that the collection area need not be two-dimensional, i.e., defined in terms of both I and Q, but can also be uni-dimensional, i.e., defined in terms of just I or just Q. Moreover, the collection area need not be centered on the I-Q plane, but can be off center. Furthermore, there can be multiple collection areas. FIG. 7B illustrates an example involving an 8-PSK symbol constellation where the collection area 702 is uni-dimensional, and defined in terms of just I, e.g., |I|<2. FIG. 7C illustrates an example involving an 8-PSK symbol constellation where the collection area 702 is uni-dimensional, and defined in terms of just Q, e.g., |Q|<2. FIG. 7D illustrates an example where two collection areas, identified with numerals 706 and 708, are defined, each of which are mirror images of the other.

Also, a collection area is not limited to being defined for an 8-PSK symbol constellation, but can be defined for any symbol constellation including, without limitation, QPSK, 16-QAM, and 64-QAM. FIG. 7E illustrates an example where collection area 722 is defined for QPSK symbol constellation 720.

Turning back to FIG. 6A, step 606 is followed by step 608, where the location of the received symbol on the predetermined coordinate system is analyzed to determine if it falls within the one or more predetermined collection areas which have been defined. If so, step 610 is performed. In this step, a value Count, which indicates the number of symbols within a group defined by Window_Size which fall within one of the collection areas, is incremented. If not, step 610 is bypasssed.

Step 612 is performed next. In step 612, a value Index is incremented. Index is a running total of the number of symbols which have been received in the current group. Step 614 follows step 612. In step 614, the value Index is analyzed to determine if it exceeds a predetermined value Window_Size. If not, the method loops back to step 602. If so, the method continues with optional step 616.

At the inception of optional step 616, the value Count indicates the number of received symbols which have fallen into one of the collection areas out of a total number of symbols defined by the value Window_Size. In optional step 616, the value of Count is averaged or filtered to remove short term fluctuations. In one embodiment, the value of Count is averaged with previous values of Count (stored in optional step 620) to form a moving average. In one implementation, the value of Count is averaged with previous values of Count simply by adding the values together.

Step 616 is followed by step 618. In step 618, the value of Count, after any averaging or filtering from step 616, is converted into an estimate of an SNR-related parameter. In one embodiment, the SNR-related parameter which is estimated is $E_S/N_0$. In one implementation of this embodiment, step 618 is performed by accessing one or more lookup tables which associate a value of Count with an estimate of $E_S/N_0$. (Values within the lookup tables may be tabulated via computer simulation.) Once determined, the value of the SNR-related parameter is then output.

The association between count values and values of the SNR-related parameter is highly dependent on the specific circumstances, but the general principle involved is as follows. First, it is assumed that the noise introduced through transmission of a symbol through a communications channel is additive, and has a Gaussian probability distribution function (pdf) with zero mean. Second, that since the noise has zero mean, and follows a Gaussian distribution, the variance $\sigma^2$ completely specifies the noise distribution. Third, the received signal has variance equal to the noise variance, and mean equal to the normalized transmitted symbol. Fourth, the conditional probability that a received signal falls within a particular collection area assuming a certain transmitted signal, can be determined by subtracting the assumed transmitted signal from the range of received signals (to form a range for the noise residual signals), and then evaluating the probability that the noise distribution (with variance $\sigma^2$) lies within that area. Fifth, it is assumed that all symbols are, on average, transmitted with equal probability. Sixth, the total probability that a received signal falls in a particular collection area is the sum of the aforesaid conditional probabilities, each multiplied by the assumed symbol probability—which is the same for every assumed symbol. Seventh, a mapping can be constructed between this total probability and the noise variance, so that the aforesaid probability calculation can be reversed, thereby enabling the noise variance to be inferred from the measured total probability—via table lookup, for example. Eighth, a count of the relative frequency (i.e., the number of counts falling within a collection area per total number of evaluated received symbols) is a proxy estimate of the actual probability. Ninth, if the signal level is normalized, a $1/\sigma^2$ transformation of a $\sigma^2$ estimate yields an SNR-related parameter estimate. Therefore, a value of the SNR-related parameter can be determined from relative counts of symbol data falling with a given collection area.

Figure 8:
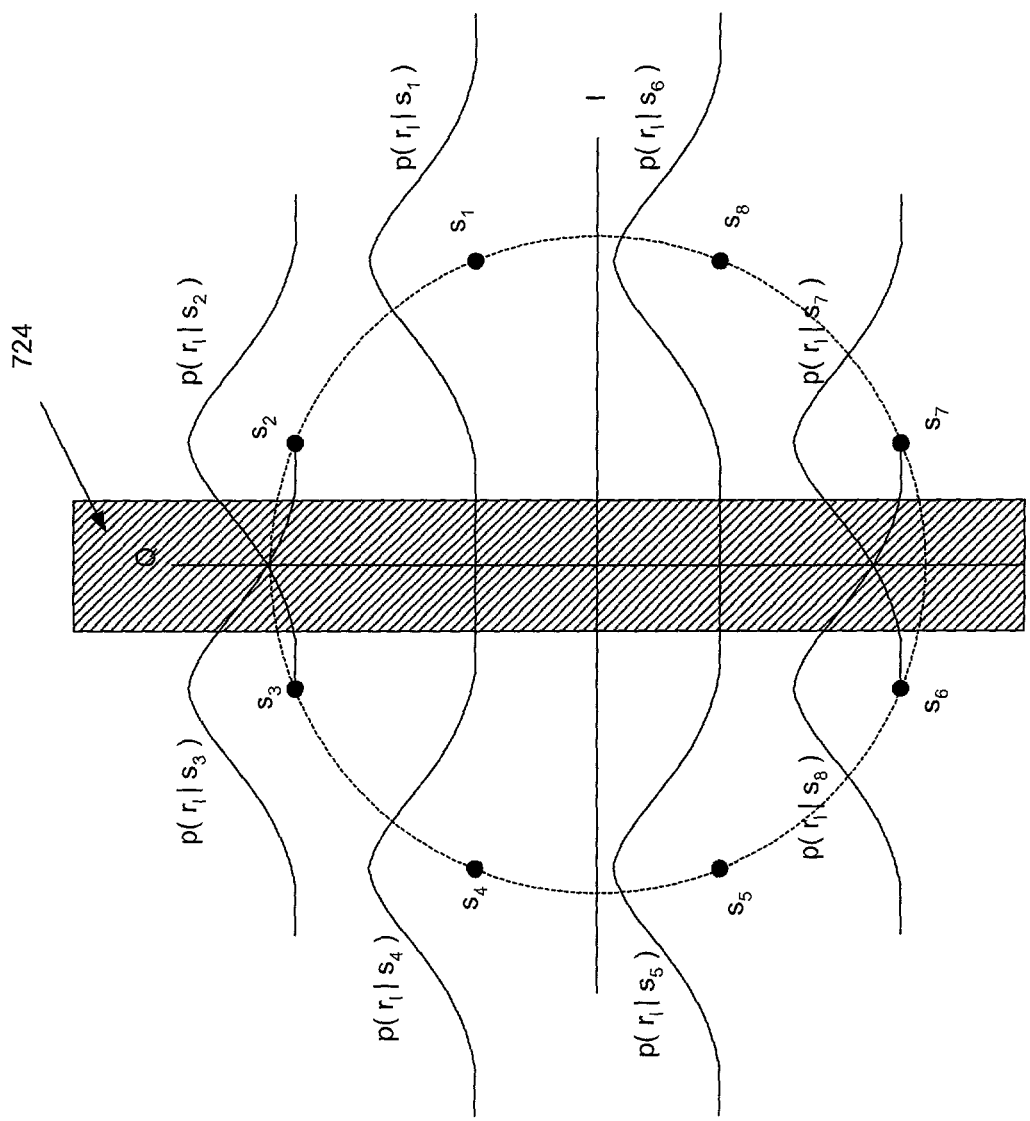
FIG. 8 illustrates the process of measuring conditional probabilities in an example collection area for an 8-PSK symbol constellation.

In the 8-PSK case, the process of determining conditional probabilities can be further explained with reference to FIG. 8, which illustrates a uni-dimensional collection area 724 (defined in terms of the I axis) superimposed on an 8-PSK symbol constellation, and the orthogonal projections (along the I axis) of the conditional pdfs for each of the eight symbols in the constellation. The probability of the received signal $r_1$ falling into the collection area is the sum of the areas of each of the pdfs within the collection area weighted by 1/8.

During a calibration phase, a table associating the parameter $\sigma^2$ with the probability of the received signal falling within the collection area can be determined. Then, during operation, a count of the relative frequency of symbols falling within the collection area can be empirically determined, and used to lookup the associated value of $\sigma^2$ (or equivalently $1/\sigma^2$) in the lookup table.

Step 618 is followed by optional step 620. In optional step 620, the value of Count, prior to the averaging and/or filtering of step 616, is stored for use in forming a moving average in subsequent invocations of step 616.

Step 620 is followed by step 622. In step 622, Count and Index are both reset to zero. The method then loops back to step 602.

In one implementation example, a collection area known as a bin is centered on the I-Q plane. Symbols within a predetermined count window are analyzed to determine the number that fall within the bin. The resulting count value is averaged over a predetermined averaging window to result in an averaged count value which is output.

The following pseudo-code illustrates the process of outputting an averaged count value in this implementation example:

Symbol_Count++;

if (I <= bin_size & I >= –bin_size & Q <= bin_size & Q >= bin_size)
 Count++;

if (Symbol_Count >= Count_Window)
 Sum = Sum + Count;
 Count = 0;
 Symbol_Count = 0;
 Num_Windows++;

if (Num_Windows >= Averaging_Window)
 Output (Sum);
 Sum = 0;
 Num_Windows = 0;

In this pseudo-code, the size of the bin is defined by bin_size, which specifies the extent to which the bin extends from the origin along both the I or Q axes. The size of the count window in terms of symbols is defined by Count_Window. The size of the averaging window in terms of count windows is defined by Averaging_Window. The count of the number of symbols falling within the bin since the last count window ended is defined by Count. The count of the number of symbols received since the last count window ended is defined by Symbol_Count.

The count of the number of count windows since the last averaging window ended is defined by the parameter Num_Windows. The running total of the number of symbols falling within the bin since the end of the last averaging window is defined by Sum.

The value of Sum is output from the foregoing process. At this point, Sum is then associated with an estimate of $E_S/N_0$. In one implementation example, this is achieved by maintaining two lookup tables, Table1 and Table2, where an entry in Table1, Table1[k], is the probability of a noisy symbol falling within a bin of the size bin_size at the value of $E_S/N_0$ indicated by a corresponding entry, Table2[k], in Table2. Note that Table1 is assumed to be monotonically decreasing, while Table2 is assumed to be monotonically increasing. (That follows from the fact that, as $E_S/N_0$ increases, the spread of the noise distribution decreases, and, so, if the bin collects noisy received data in an area lying between noise-free symbol locations, the probability of a symbol falling in the bin decreases.) Also, the values of $E_S/N_0$ in Table2 are expressed in terms of dB; and Table2 depends on the symbol constellation, with different instantiations of the table being appropriate for 8-PSK and QPSK, and the bin size.

To perform this association, entries in Table1 are first converted to count values by multiplying them by a factor A, which is the product of Count_Window and Averaging_Window. The two count values derived from Table1 which bound the value Sum are then determined. These two entries will bear the following relationship to Sum:

$$A \cdot \text{Table1}[k] \geq \text{Sum} \geq A \cdot \text{Table1}[k+1] \qquad (12)$$

The two corresponding entries in Table2, Table2[k] and Table2[k+1], are then retrieved. The estimate of $E_S/N_0$ corresponding to Sum is then interpolated from these two values as follows:

$$ESNO = \text{Table } 2[k] + \quad (13)$$

$$\frac{A \cdot Table1[k] - Sum}{A \cdot (Table1[k] - Table1[k+1])} \cdot (Table2[k+1] - Table2[k])$$

Pseudo-code illustrating these operations is as follows:

for (n = 0; n < Number_of_rows; n++)
  if (Sum >= A·Table1[n+1] & Sum <= A·Table1[n])
  row = n+1;
  if (Sum >= A·Table1[0])
  row = 0;
  if (Sum <= A·Table1[Number_of_rows − 1])
  row = Number_of_rows − 1;

b0 = A·Table1[row−1];

b1 = A·Table1[row];

ESNO = Table2[row−1] + ((b0 − Sum)/(b0 − b1))·(Table2[row] − Table2[row−1]);

Note that the value ESNO in this implementation example is refreshed every Count_Window symbols.

As an alternative to the foregoing, the values in Table1 may already in the form of count values. In this alternative, the two entries in Table1 which bound Sum, Table1[k] and Table1[k+1], are determined. Then, the two corresponding entries in Table2, Table2[k] and Table2[k+1], are retrieved, and the value ESNO determined as follows:

$$ESNO = Table2[k] + \quad (14)$$

$$\frac{Table1[k] - Sum}{(Table1[k] - Table1[k+1])} \cdot (Table2[k+1] - Table2[k])$$

The value ESNO may then be converted to a scale factor, SCALE, for use in the $1/\sigma^2$ scaling application described at the outset. The conversion is necessary since ESNO is expressed in dB, and SCALE needs to be in linear terms. In one implementation example, this is performed through a third lookup table, Table3, which maps values of ESNO to values of SCALE. This table implements the following function:

$$SCALE = 10^{(ESNO-7)/20} \quad (15)$$

In one implementation example, the resulting value of SCALE is a 12 bit number in the range [0.5, 2.5]. The incoming I and Q components of the received symbols are each 10 bits. The resulting scaled symbol (post-scaling multiplication) is 21 bits for each component. The scaled symbols are then input to a 5-bit quantizer which implements a uniform quantization scheme, where the quantization delta, $\Delta$, is 1.9938. The resulting quantized, scaled symbols have 5 bits for each component.

It should be appreciated that any of the foregoing methods may be tangibly embodied as a series of instructions stored on a processor readable medium or memory including, without limitation, RAM, ROM, PROM, EPROM, EEPROM, hard disk, floppy disk, CD-ROM, DVD, tape, flash memory, etc. A system may also be formed comprising the processor readable medium coupled to a processor configured to access and execute the instructions stored on the processor readable medium.

A system for performing the method may also be designed and executed using synthesized (digital) combinatorial logic elements, arithmetic elements, and memory. System control may be implemented by a finite state machine embodied in the form of ASIC hardware. The ASIC hardware may be synthesized using combinatorial logic, e.g. AND/OR/NAND/NOR/XOR/NOT gates and flip-flops. In this implementation, the finite state machine may be used for control, RAM may be used for table storage, and arithmetic units (adders, multipliers) may be used to perform the necessary arithmetic for interpolation, scaling, etc. In one implementation example, software chip design tools may be used to synthesize the algorithm as digital logic, with state machine control. In this implementation example, there may be no distinct CPU on the actual chip that formally processes 'instructions'. However, it should be appreciated that a system in which a CPU formally processes instructions is still within the scope of the invention.

Any of the methods of the invention may be embodied as hardware, software, or a combination of hardware and software. The hardware may comprise dedicated analog or digital circuitry, integrated circuits, ASICs, PLAs, or the like. The software may comprise instructions executable by a DSP. For purposes of this disclosure, the term "logic" will encompass hardware, software, or a combination or hardware and software for performing a function.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A system for estimating an SNR-related parameter for one or more symbols received over a communication channel comprising:
   first logic for determining a count of the number of received symbols in a predetermined number of received symbols that fall within one or more predetermined collection areas located on a symbol constellation defining a plurality of symbols, wherein the one or more predetermined collection areas are exclusive of the plurality of symbols defined by the symbol constellation;
   second logic for associating the count with a value, from which the estimated SNR-related parameter is derived, using one or more lookup tables; and
   third logic for processing one or more symbols, received over the communication channel, using the SNR-related parameter.

2. The system of claim 1 wherein the symbols are quadrature symbols having in-phase (I) and quadrature (Q) components, the one or more collection areas are defined in relation to an I-Q plane, and the first logic determines if a received symbol falls into the one or more collection areas from the I and Q components of the symbol.

3. The system of claim 1 wherein the SNR-related parameter is $E_S/N_0$.

4. The system of claim 3 wherein the second logic associates the count with a value of $E_S/N_0$ expressed in dB.

5. The system of claim 1 wherein the second logic associates the count with a value, from which the estimated SNR-related parameter is derived, using a plurality of lookup tables.

6. A system for estimating an SNR-related parameter for one or more symbols received over a communication channel comprising:
   first logic for determining a count of the number of received symbols in a predetermined number of received symbols that fall within one or more predetermined collection areas having a size;

second logic for associating the count with a value, from which the estimated SNR-related parameter is derived, using first and second lookup tables, wherein at least the first lookup table depends on a symbol constellation and the size of the one or more collection areas; and third logic for processing one or more symbols, received over the communication channel, using the SNR-related parameter.

7. The system of claim 6 wherein the symbol constellation is an 8-PSK symbol constellation.

8. The system of claim 6 wherein the symbol constellation is a QPSK symbol constellation.

9. A system for estimating an SNR-related parameter for one or more symbols received over a communication channel comprising:

first logic for determining a count of the number of received symbols in a predetermined number of received symbols that fall within one or more predetermined collection areas having a size;

second logic for associating the count with a value, from which the estimated SNR-related parameter is derived, using first and second lookup tables, wherein each entry in the first table is the probability of a received symbol falling into the one or more collection areas at a given value of the SNR-related parameter, which comprises a corresponding entry in the second table, and third logic for processing one or more symbols, received over the communication channel, using the SNR-related parameter.

10. The system of claim 9 wherein the second logic correlates the count with an estimate of the SNR-related parameter by (1) translating entries in the first table to count values through multiplication by the predetermined number of symbols; (2) determining which entries in the first table, after translation into count values, bound the count; (3) determining the corresponding entries in the second table; and (4) interpolating between the corresponding entries in the second table to arrive at the estimate of the SNR-related parameter.

11. A system for estimating an SNR-related parameter for one or more symbols received over a communication channel comprising:

first logic for determining a count of the number of received symbols in a predetermined number of received symbols that fall within one or more predetermined collection areas having a size;

second logic for associating the count with a value, from which the estimated SNR-related parameter is derived, using first and second lookup tables, wherein each entry in the first table is a count of the number of received symbols expected to fall into the one or more collection areas at a given value of the SNR-related parameter, which comprises a corresponding entry in the second table, and third logic for processing one or more symbols, received over the communication channel, using the SNR-related parameter.

12. The system of claim 11 wherein the second logic associates the count with an estimate of the SNR-related parameter by (1) determining which entries in the first table bound the count; (2) determining the corresponding entries in the second table; and (3) interpolating between the corresponding entries in the second table to arrive at the estimate of the SNR-related parameter.

13. A system for scaling a symbol with a scaling factor derived from an estimate of an SNR-related parameter for one or more symbols received over the communication channel comprising:

first logic for determining a count of the number of received symbols in a predetermined number of symbols which fall within one or more predetermined collection areas located on a symbol constellation defining a plurality of symbols, wherein the one or more predetermined collection areas are exclusive of the plurality of symbols defined by the symbol constellation;

second logic for correlating the count with a value, from which the estimated SNR-related parameter is derived, using one or more lookup tables; and third logic for scaling one or more symbols, received over the communication channel, with a scaling factor derived from the estimated SNR-related parameter.

14. The system of claim 13 further comprising fourth logic for quantizing the scaled symbol.

15. The system of claim 13 wherein the value of the SNR-related parameter is $E_S/N_0$ expressed in dB, and the scaling factor is the value of $E_S/N_0$ converted into linear terms.

16. The system of claim 14 wherein the fourth logic quantizes the scaled symbol using a uniform quantization delta.

17. The system of claim 16 wherein the quantization delta is optimized around a predetermined $E_S/N_0$ value.

18. A system for estimating an SNR-related parameter for one or more symbols received over a communication channel comprising:

first means for determining a count of the number of symbols in a predetermined number of symbols which fall within one or more predetermined collection areas located on a symbol constellation defining a plurality of symbols, wherein the one or more predetermined collection areas are exclusive of the plurality of symbols defined by the symbol constellation;

second means for associating the count with a value, from which the estimated SNR-related parameter is derived, using one or more lookup tables, and third means for processing one or more symbols, received over the communication channel, using the SNR-related parameter.

19. A system for scaling a symbol with a scaling factor derived from an estimate of an SNR-related parameter for one or more symbols received over the communication channel comprising:

first means for determining a count of the number of symbols in a predetermined number of symbols which fall within one or more predetermined collection areas located on a symbol constellation defining a plurality of symbols, wherein the one or more predetermined collection areas are exclusive of the plurality of symbols defined by the symbol constellation;

second means for associating the count with a value, from which the estimated SNR-related parameter is derived, using one or more lookup tables; and third means for scaling one or more symbols, received over the communication channel, with a scaling factor derived from the estimated SNR-related parameter.

20. The system of claim 19 further comprising fourth means for quantizing the scaled symbol.

21. The system of any of claims 1, 13, 18, or 19 in a second system which includes a decoder.

22. The second system of claim 21 wherein the decoder comprises a log-MAP decoder.

23. The second system of claim 22 implemented as one or more integrated circuit chips.

24. A method of estimating an SNR-related parameter for one or more symbols received over a communication channel comprising:
   determining a count of the number of symbols in a predetermined number of received symbols which fall within one or more predetermined collection areas located on a symbol constellation defining a plurality of symbols, wherein the one or more predetermined collection areas are exclusive of the plurality of symbols defined by the symbol constellation;
   correlating the count with a value, from which the estimated SNR-related parameter is derived, using one or more lookup tables; and
   processing one or more symbols, received over the communication channel, using the SNR-related parameter.

25. The method of claim 24 wherein the symbols are quadrature symbols having in-phase (I) and quadrature (Q) components, the one or more collection areas are defined in relation to an I-Q plane, and the determining step comprises determining if a symbol falls into the one or more collection areas from the I and Q components of the symbol.

26. The method of claim 24 wherein the SNR-related parameter is $E_S/N_0$.

27. The method of claim 26 wherein the correlating step comprises associating the count with a value of $E_S/N_0$ expressed in dB.

28. The method of claim 24 wherein the correlating step comprises associating the count with a value, from which the estimated SNR-related parameter is derived, using a plurality of lookup tables.

29. A method of estimating an SNR-related parameter for one or more symbols received over a communication channel comprising:
   determining a count of the number of symbols in a predetermined number of received symbols which fall within one or more predetermined collection areas having a size;
   correlating the count with a value, from which the estimated SNR-related parameter is derived, using first and second lookup tables, wherein at least the first lookup table depends on a symbol constellation and the size of the one or more collection areas; and
   processing one or more symbols, received over the communication channel, using the SNR-related parameter.

30. The method of claim 29 wherein the symbol constellation is an 8-PSK symbol constellation.

31. The method of claim 29 wherein the symbol constellation is a QPSK symbol constellation.

32. A method of estimating an SNR-related parameter for one or more symbols received over a communication channel comprising:
   determining a count of the number of symbols in a predetermined number of received symbols which fall within one or more predetermined collection areas having a size;
   correlating the count with a value, from which the estimated SNR-related parameter is derived, using first and second lookup tables, wherein each entry in the first table is the probability of a received symbol falling into the one or more collection areas at a given value of the SNR-related parameter, which comprises a corresponding entry in the second table; and
   processing one or more symbols, received over the communication channel, using the SNR-related parameter.

33. The method of claim 32 wherein the correlating step comprises associating the count with an estimate of the SNR-related parameter by (1) translating entries in the first table to count values through multiplication by the predetermined number of symbols; (2) determining which entries in the first table, after translation into count values, bound the count; (3) determining the corresponding entries in the second table; and (4) interpolating between the corresponding entries in the second table to arrive at the estimate of the SNR parameter.

34. A method of estimating an SNR-related parameter for one or more symbols received over a communication channel comprising:
   determining a count of the number of symbols in a predetermined number of received symbols which fall within one or more predetermined collection areas having a size;
   correlating the count with a value, from which the estimated SNR-related parameter is derived, using first and second lookup tables, wherein each entry in the first table is a count of the number of received symbols expected to fall into the one or more collection areas at a given value of the SNR-related parameter, which comprises a corresponding entry in the second table; and
   processing one or more of symbols, received over the communication channel, using the SNR-related parameter.

35. The method of claim 34 wherein the correlating step comprises associating the count with an estimate of the SNR-related parameter by (1) determining which entries in the first table bound the count; (2) determining the corresponding entries in the second table; and (3) interpolating between the corresponding entries in the second table to arrive at the estimate of the SNR parameter.

36. A method of scaling a symbol with a scaling factor derived from an estimate of an SNR-related parameter for one or more symbols received over a communication channel comprising:
   determining a count of the number of symbols in a predetermined number of symbols which fall within one or more predetermined collection areas located on a symbol constellation defining a plurality of symbols, wherein the one or more predetermined collection areas are exclusive of the plurality symbols defined by the symbol constellation;
   associating the count with a value, from which the estimated SNR parameter is derived, using one or more lookup tables; and
   scaling one or more symbols, received over the communication channel, with a scaling factor derived from the estimated SNR-related parameter.

37. The method of claim 36 further comprising quantizing the scaled symbol.

38. The method of claim 36 wherein the value of the SNR-related parameter is $E_S/N_0$ expressed in dB, and the scaling factor is the value of $E_S/N_0$ converted into linear terms.

39. The method of claim 37 further comprising quantizing the scaled symbol using a uniform quantization delta.

40. The method of claim 39 wherein the quantization delta is optimized around a predetermined $E_S/N_0$ value.

41. A method of estimating an SNR-related parameter for one or more symbols received over a communication channel comprising:

a step for determining a count of the number of symbols in a predetermined number of symbols that fall within one or more predetermined collection areas located on a symbol constellation defining a plurality of symbols, including averaging, filtering or summing the count over a plurality of symbol groups, wherein the one or more predetermined collection areas are exclusive of the plurality of symbols defined by the symbol constellation;

a step for associating the count with a value, from which the estimated SNR-related parameter is derived, using one or more lookup tables; and a step for processing one or more symbols, received over the communication channel, using the SNR-related parameter.

42. A method of scaling a symbol with a scaling factor derived from an estimate of an SNR-related parameter for one or more symbols received over a communication channel comprising:

a step for determining a count of the number of symbols in a predetermined number of symbols that fall within one or more predetermined collection areas located on a symbol constellation defining a plurality of symbols, including averaging, filtering or summing the count over a plurality of symbol groups, wherein the one or more predetermined collection areas are exclusive of the plurality of symbols defined by the symbol constellation;

a step for associating the count with a value, from which the estimated SNR-related parameter is derived, using one or more lookup tables; and a step for scaling one or more symbols, received over the communication channel, with a scaling factor derived from the estimated SNR-related parameter.

43. The method of claim 42 further comprising a step for quantizing the scaled symbol.

44. A computer-readable medium encoded with a computer program tangibly embodying any of the methods of claims 24, 36, 41 or 42.

45. A system comprising the computer-readable medium of claim 44 and a processor configured to access and execute the computer program encoded on the medium.

46. A system tangibly embodying any of the methods of claims 24, 36, 41, or 42, comprising a state machine, a memory, and one or more arithmetic elements.

47. The system of claim 46 wherein the state machine provides control, one or more lookup tables are stored in the memory, and the one or more arithmetic elements perform arithmetic operations for scaling or interpolation.

48. The system of claim 47 wherein the state machine is comprised of one or more ASICs.

49. The system of claim 48 wherein the one or more ASICs are synthesized logic.

50. The system of any of claims 1, 6, 9, 13, 18 or 19 wherein the count is averaged, filtered or summed over a plurality of symbol groups.

51. The method of any of claims 24, 29, 32, 34 or 36 further comprising averaging, filtering or summing the count over a plurality of symbol groups.

* * * * *

UNITED STATES PATENT AND TRADEMARK OFFICE
CERTIFICATE OF CORRECTION

PATENT NO. : 7,310,369 B1  Page 1 of 1
APPLICATION NO. : 09/870926
DATED : December 18, 2007
INVENTOR(S) : Kreiger et al.

It is certified that error appears in the above-identified patent and that said Letters Patent is hereby corrected as shown below:

Title page,
Item [75], delete "Sachar Kons" and replace with --Shachar Kons--;

Signed and Sealed this

Nineteenth Day of August, 2008

JON W. DUDAS
*Director of the United States Patent and Trademark Office*